(12) United States Patent
Hanabusa

(10) Patent No.: US 11,336,122 B2
(45) Date of Patent: May 17, 2022

(54) WIRELESS POWER TRANSMISSION DEVICE AND WIRELESS POWER TRANSMISSION SYSTEM

(71) Applicant: TDK Corporation, Tokyo (JP)

(72) Inventor: Kazuyoshi Hanabusa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 4 days.

(21) Appl. No.: 16/908,010

(22) Filed: Jun. 22, 2020

(65) Prior Publication Data
US 2020/0412171 A1    Dec. 31, 2020

(30) Foreign Application Priority Data
Jun. 25, 2019   (JP) .............................. JP2019-116879

(51) Int. Cl.
*H02J 50/12*     (2016.01)
*H02J 50/80*     (2016.01)
*H02M 7/5387*    (2007.01)
*H02M 3/156*     (2006.01)
*H02J 7/02*      (2016.01)

(52) U.S. Cl.
CPC ................ *H02J 50/12* (2016.02); *H02J 7/02* (2013.01); *H02J 50/80* (2016.02); *H02M 3/156* (2013.01); *H02M 7/5387* (2013.01)

(58) Field of Classification Search
CPC .. H02J 7/02; H02J 50/12; H02J 50/80; H02M 3/156; H02M 7/5387
USPC ........................................................ 327/104
See application file for complete search history.

(56) References Cited

U.S. PATENT DOCUMENTS

| 11,095,161 | B2* | 8/2021 | Shijo ....................... H02J 50/40 |
| 2011/0115303 | A1* | 5/2011 | Baarman ................. H02J 7/025 307/104 |
| 2015/0048688 | A1 | 2/2015 | Yamakawa et al. |
| 2015/0054456 | A1 | 2/2015 | Yamakawa et al. |
| 2015/0061580 | A1 | 3/2015 | Yamakawa et al. |
| 2015/0280455 | A1* | 10/2015 | Bosshard .............. B60L 53/126 307/104 |
| 2016/0064951 | A1* | 3/2016 | Yamamoto .............. H02J 50/12 307/104 |

(Continued)

FOREIGN PATENT DOCUMENTS

| JP | 2018-074792 A | 5/2018 |
| WO | 2013-129451 A1 | 9/2013 |

(Continued)

*Primary Examiner* — William Hernandez
(74) *Attorney, Agent, or Firm* — Oliff PLC

(57) ABSTRACT

A wireless power transmission device capable of reducing an output power of wireless power receiving device receiving power transmitted from a wireless power transmission device. The wireless power transmission device including: a DC (Direct Current)/DC converter; an inverter configured to convert output voltage of the DC/DC converter into AC voltage having driving frequency; a power transmission coil configured for the AC voltage to be supplied to from the inverter and configured to generate the AC magnetic field; a transmission-side resonance circuit including the power transmission coil; and control circuit configured to increase difference between a driving frequency of the inverter and a resonance frequency of the transmission-side resonance circuit when a predetermined condition is satisfied.

32 Claims, 7 Drawing Sheets

(56) References Cited

U.S. PATENT DOCUMENTS

| | | | |
|---|---|---|---|
| 2016/0352139 A1* | 12/2016 | Takatsu | H02J 50/12 |
| 2017/0126065 A1* | 5/2017 | Park | H02J 50/12 |
| 2018/0123397 A1 | 5/2018 | Tsukiyama | |
| 2019/0006843 A1* | 1/2019 | Suzuki | H02J 7/04 |
| 2020/0303959 A1* | 9/2020 | Hanabusa | H02J 50/12 |
| 2021/0006094 A1* | 1/2021 | Shijo | H02J 7/02 |
| 2021/0099018 A1* | 4/2021 | Tabata | H02J 50/12 |

FOREIGN PATENT DOCUMENTS

| | | |
|---|---|---|
| WO | 2013-129452 A1 | 9/2013 |
| WO | 2013-145488 A1 | 10/2013 |
| WO | 2015-008506 A1 | 1/2015 |

* cited by examiner

WIRELESS POWER TRANSMISSION DEVICE AND WIRELESS POWER TRANSMISSION SYSTEM

BACKGROUND OF THE INVENTION

Field of the Invention

The present invention relates to a wireless power transmission device and a wireless power transmission system.

Priority is claimed on Japanese Patent Application No. 2019-116879, filed Jun. 25, 2019, the content of which is incorporated herein by reference.

Description of Related Art

Research and development into technologies related to wireless power transmission systems are being conducted. The wireless power transmission system performs wireless power transmission between a wireless power transmission device including a power transmission coil and a wireless power receiving device including a power receiving coil. Note that, in the present specification, the wireless power transmission refers to transmission of power in a wireless manner.

In this regard, there has been known a wireless power transmission system in which a battery is connected as a load to the wireless power receiving device and an output voltage of a DC/DC converter included in the wireless power transmission device is controlled based on a load voltage (that is, a charging voltage of the battery) (see Patent Document 1). The load voltage is a voltage supplied from the wireless power receiving device to the load (that is, an output voltage of the wireless power receiving device). Furthermore, a load current is a current supplied from the wireless power receiving device to the load (that is, an output current of the wireless power receiving device).

PATENT DOCUMENTS

[Patent Document 1] Japanese Unexamined Patent Application, First Publication No. 2018-074792

SUMMARY OF THE INVENTION

However, it is not possible to reduce the output voltage of the DC/DC converter without limit. Therefore, in the wireless power transmission system disclosed in Patent Document 1, a minimum value of load power is limited by the lowest value of the output voltage of the DC/DC converter. The load power is power supplied from the wireless power receiving device to the load (that is, output power of the wireless power receiving device). More specifically, when the output voltage of the DC/DC converter is the lowest value, the wireless power transmission system is not able to further reduce the load current. As a consequence, in such a case, the wireless power transmission system is not able to further reduce the load power.

An aspect of the present invention is to provide a wireless power transmission device and a wireless power transmission system, by which it is possible to further reduce output power of a wireless power receiving device that receives power transmitted from the wireless power transmission device even though an output voltage of a DC/DC converter is the lowest value.

Solution to Problem

An aspect of the present invention is a wireless power transmission device configured to transmit AC (Alternating Current) power to a wireless power receiving device including a power receiving coil by using an AC magnetic field, the wireless power transmission device comprising: a DC (Direct Current)/DC converter; an inverter configured to convert an output voltage of the DC/DC converter into an AC voltage having a driving frequency; a power transmission coil configured for the AC voltage to be supplied to from the inverter and configured to generate the AC magnetic field; a transmission-side resonance circuit including the power transmission coil; and a control circuit configured to increase a difference between a driving frequency of the inverter and a resonance frequency of the transmission-side resonance circuit when a predetermined condition is satisfied.

According to the present invention, even though the output voltage of the DC/DC converter is the lowest value, it is possible to further reduce the output power of the wireless power receiving device that receives power transmitted from the wireless power transmission device.

DETAILED DESCRIPTION OF THE INVENTION

Embodiment

Hereinafter, an embodiment of the present invention will be described with reference to the drawings.

<Configuration of Wireless Power Transmission System>

Figure 1:
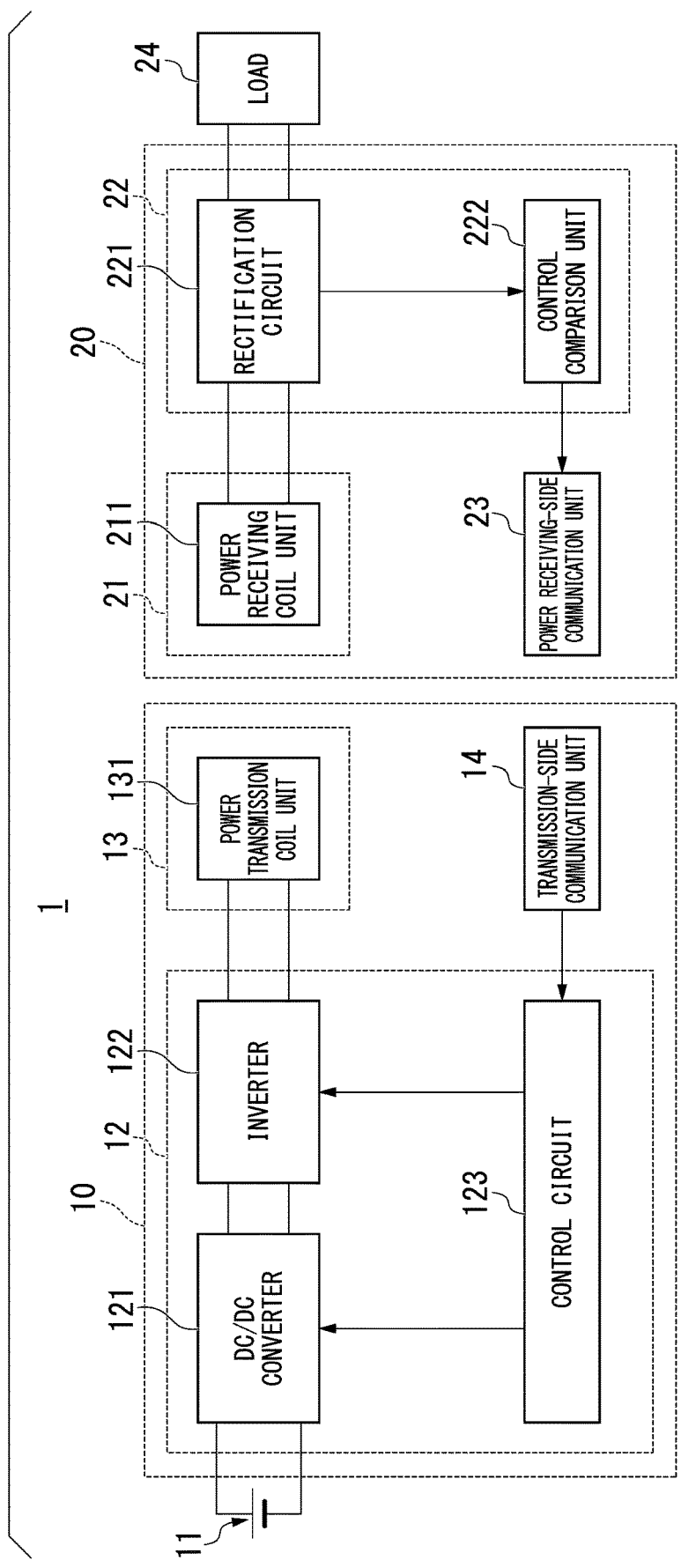
FIG. 1 is a diagram illustrating an example of a configuration of a wireless power transmission system 1 according to an embodiment.

The configuration of a wireless power transmission system 1 according to an embodiment will be described. FIG. 1 is a diagram illustrating an example of the configuration of the wireless power transmission system 1 according to the embodiment.

The wireless power transmission system 1 includes a wireless power transmission device 10 and a wireless power receiving device 20. In the wireless power transmission system 1, power is transmitted from the wireless power transmission device 10 to the wireless power receiving device 20 by wireless power transmission. The wireless power receiving device 20 can be connected to a load 24. In the example illustrated in FIG. 1, the wireless power receiving device 20 is connected to the load 24. That is, in the wireless power transmission system 1 illustrated in FIG. 1, the wireless power receiving device 20 supplies the load 24 with power transmitted from the wireless power transmission device 10. The load 24 is, for example, a rechargeable secondary battery (for example, a lithium ion battery, a lithium polymer battery and the like). Note that the load 24 may be another device that performs an operation according to a DC (Direct Current) voltage, instead of the secondary battery.

The wireless power transmission device 10 is connected to a DC power supply 11.

The DC power supply 11 is a power supply that supplies a DC voltage. The DC power supply 11 may be any power supply as long as it supplies a DC voltage. The DC power supply 11 is, for example, a DC power supply obtained by rectifying and smoothing a commercial power supply, a secondary battery, a switching power supply and the like. The switching power supply is a switching converter and the like. The DC power supply 11 supplies the DC voltage to the wireless power transmission device 10.

The wireless power transmission device 10 transmits power to the wireless power receiving device 20 by wireless power transmission based on the DC voltage supplied from the DC power supply 11. Note that the wireless power transmission device 10 may be configured to be connected to an AC (Alternating Current) power supply capable of supplying an AC voltage, instead of being connected to the DC power supply 11. In such a case, the wireless power transmission device 10 transmits power to the wireless power receiving device 20 by wireless power transmission based on the AC voltage supplied from the AC power supply.

Furthermore, the wireless power transmission device 10 includes, for example, a power transmission circuit 12, a power transmission coil part 13, and a transmission-side communication unit 14. Note that the wireless power transmission device 10 may have a configuration including other circuits in addition to the power transmission circuit 12, the power transmission coil part 13, and the transmission-side communication unit 14.

The power transmission circuit 12 converts the DC voltage supplied from the DC power supply 11 into an AC voltage having a driving frequency. The power transmission circuit 12 includes, for example, a DC/DC converter 121, an inverter 122, and a control circuit 123. Note that the power transmission circuit 12 may have a configuration including other circuits in addition to the DC/DC converter 121, the inverter 122, and the control circuit 123. For example, when the wireless power transmission device 10 is connected to an AC power supply instead of the DC power supply 11, the wireless power transmission device 10 further includes a circuit that converts an AC voltage into a DC voltage (for example, an AC/DC converter and the like).

The DC/DC converter 121 converts the DC voltage supplied from the DC power supply 11 into a DC voltage having a magnitude according to the control of the control circuit 123. The DC/DC converter 121 supplies the inverter 122 with the converted DC voltage as an output voltage of the DC/DC converter 121.

The inverter 122 is, for example, a switching circuit in which switching elements are bridge-connected (a full bridge circuit, a half bridge circuit and the like). The inverter 122 converts the output voltage of the DC/DC converter 121 (that is, the DC voltage supplied from the DC/DC converter 121) into an AC voltage having a driving frequency according to the control of the control circuit 123. The inverter 122 supplies the converted AC voltage to the power transmission coil part 13.

The control circuit 123 controls the DC/DC converter 121 by any one of constant current control, constant voltage control, and constant power control. The constant current control is feedback control that maintains an output current from the wireless power receiving device 20 to the load 24 to be constant based on a control signal acquired from the wireless power receiving device 20 via the transmission-side communication unit 14. Furthermore, the constant voltage control is feedback control that maintains an output voltage from the wireless power receiving device 20 to the load 24 to be constant based on the control signal. Furthermore, the constant power control is feedback control that maintains output power from the wireless power receiving device 20 to the load 24 to be constant based on the control signal. In the embodiment, maintaining a certain value to be constant means that when the value increases or decreases, the value is changed so as to cancel the increase or decrease.

More specifically, when a load voltage has not reached a set voltage V1, the control circuit 123 performs the constant current control. In the embodiment, the load voltage is a voltage supplied from the wireless power receiving device 20 to the load 24 (that is, an output voltage of the wireless power receiving device 20). The set voltage V1 may be any voltage as long as it is a set voltage. Hereinafter, a case where the set voltage V1 is a maximum value of the load voltage will be described as an example.

On the other hand, when the load voltage has reached the set voltage V1, the control circuit 123 performs the constant voltage control. That is, in charging the load 24, the control circuit 123 performs the constant current control until the load voltage reaches the set voltage V1 and performs the constant voltage control after the load voltage reaches the set voltage V1. Then, in a constant voltage period, the control circuit 123 gradually lowers the output voltage of the DC/DC converter 121 and reduces a load current with the passage of time. In the embodiment, the constant voltage period is a period during which the control circuit 123 is performing the constant voltage control. Furthermore, in the embodiment, the load current is a current supplied from the wireless power receiving device 20 to the load 24 (that is, an output current of the wireless power receiving device 20).

However, when reducing the load current in the constant voltage period, the control circuit 123 is not able to reduce the output voltage of the DC/DC converter 121 without limit. For example, when the output voltage of the DC/DC converter 121 is the lowest value in a voltage range set as an output limit range for the output voltage, the control circuit 123 is not able to further reduce the load current by controlling the output voltage of the DC/DC converter 121. In other words, in such a case, the control circuit 123 is not able to further reduce the load power by controlling the output voltage of the DC/DC converter 121. The load power is power supplied from the wireless power receiving device 20 to the load 24. Hereinafter, for convenience of description, the lowest value is referred to as a set voltage V2. Note that the set voltage V2 is an example of a first set voltage. The output limit range may be set arbitrarily for the output voltage. Hereinafter, a case where the output limit range is a voltage range including, as a lower limit, the lowest value among voltages that can be output by the DC/DC converter 121 will be described as an example. In such a case, the set voltage V2 is the lowest value.

Then, when a predetermined condition is satisfied in the constant voltage period, the control circuit 123 performs control for increasing a difference between a driving frequency of the inverter 122 and a resonance frequency of a transmission-side resonance circuit to be described below. The predetermined condition is that the output voltage of the DC/DC converter 121 is the set voltage V2 (the lowest value among voltages that can be output by the DC/DC converter 121 in the embodiment).

When the difference between the driving frequency of the inverter 122 and the resonance frequency of the transmission-side resonance circuit increases, efficiency of the wireless power transmission is reduced and the load current is further reduced. That is, even though the output voltage of the DC/DC converter 121 is the set voltage V2, the control circuit 123 performs control for increasing the difference between the driving frequency of the inverter 122 and the resonance frequency, thereby further reducing the load power.

When the predetermined condition is satisfied in the constant voltage period, the control circuit 123 may be configured to perform output voltage holding control for changing the output voltage of the DC/DC converter 121 to be a target voltage that is a target for matching the output voltage, or may be configured not to perform the output voltage holding control. Hereinafter, a case where the control circuit 123 performs the output voltage holding control in the above case will be described as an example.

Furthermore, when the predetermined condition is not satisfied, the control circuit 123 controls the driving frequency of the inverter 122, and controls a phase difference time between an output voltage of the inverter 122 and an output current of the inverter 122 to be a predetermined phase difference time. Note that, in such a case, the control circuit 123 may be configured to control the driving frequency of the inverter 122, and to control a phase difference angle between the output voltage of the inverter 122 and the output current of the inverter 122 to be a predetermined phase difference angle.

Note that the control circuit 123 may be configured to perform the constant power control between a constant current period and the constant voltage period. The constant current period is a period during which the control circuit 123 is performing the constant current control.

The power transmission coil part 13 includes a power transmission coil unit 131, for example. Note that the power transmission coil part 13 may have a configuration including other circuits in addition to the power transmission coil unit 131.

The power transmission coil unit 131 includes a coil, which serves as an antenna for the wireless power transmission, as a power transmission coil L1 not illustrated in FIG. 1. That is, the power transmission coil L1 generates an AC magnetic field according to the AC voltage supplied from the inverter 122. In this way, the power transmission coil unit 131 transmits power to the wireless power receiving device 20 by the wireless power transmission via the power transmission coil L1. Furthermore, the power transmission coil unit 131 includes a resonance circuit including the power transmission coil L1 as the aforementioned transmission-side resonance circuit. The transmission-side resonance circuit may have any circuit configuration as long as it includes the power transmission coil L1 and constitutes the resonance circuit. For example, the transmission-side resonance circuit includes a capacitor together with the power transmission coil L1. Note that the power transmission coil unit 131 may have a configuration not including the transmission-side resonance circuit. However, even in such a case, the power transmission coil unit 131 includes the power transmission coil L1. Furthermore, in such a case, when the predetermined condition is satisfied in the constant voltage period, the aforementioned control circuit 123 performs control for increasing a difference between the driving frequency of the inverter 122 and a resonance frequency of a power receiving-side resonance circuit to be described below. Furthermore, the power transmission coil unit 131 may have a configuration including at least one of a magnetic body that enhances magnetic coupling between the power transmission coil L1 and a power receiving coil L2 to be described below and an electromagnetic shield (for example, a metal plate and the like) that suppresses leakage of a magnetic field generated by the power transmission coil L1 to the outside.

The transmission-side communication unit 14 is, for example, a communication circuit (or a communication device) that transmits and receives signals by wireless communication, optical communication, electromagnetic induction, sound, vibration and the like. The transmission-side communication unit 14 outputs, for example, a control signal received from the wireless power receiving device 20 to the control circuit 123.

The wireless power receiving device 20 includes a power receiving coil part 21, a power receiving circuit 22, and a power receiving-side communication unit 23. Note that the wireless power receiving device 20 may have a configuration including the load 24.

The power receiving coil part 21 includes a power receiving coil unit 211, for example. Note that the power receiving coil part 21 may have a configuration including other circuits in addition to the power receiving coil unit 211.

The power receiving coil unit 211 includes a coil, which serves as an antenna for the wireless power transmission, as the power receiving coil L2 not illustrated in FIG. 1. The power receiving coil unit 211 receives power from the wireless power transmission device 10 by the wireless power transmission via the power receiving coil L2. Furthermore, the power receiving coil unit 211 includes a resonance circuit including the power receiving coil L2 as the aforementioned power receiving-side resonance circuit. The power receiving-side resonance circuit may have any circuit configuration as long as it includes the power receiving coil L2 and constitutes the resonance circuit. For example, the power receiving-side resonance circuit includes a capacitor together with the power receiving coil L2. Note that the power receiving coil unit 211 may have a configuration not including the power receiving-side resonance circuit. However, even in such a case, the power receiving coil unit 211 includes the power receiving coil L2. Note that the power receiving coil unit 211 may have a configuration including at least one of a magnetic body that enhances magnetic coupling between the power receiving coil L2 and the power transmission coil L1 and an electromagnetic shield (for example, a metal plate and the like) that suppresses leakage of a magnetic field generated by the power receiving coil L2 to the outside.

The power receiving circuit 22 includes, for example, a rectification circuit 221 and a control comparison unit 222.

Note that the power receiving circuit 22 may have a configuration including other circuits in addition to the rectification circuit 221 and the control comparison unit 222.

The rectification circuit 221 is connected to the power receiving coil unit 211. The rectification circuit 221 converts an AC voltage received by the power receiving coil unit 211 via the power receiving coil L2 into a DC voltage. The rectification circuit 221 supplies the converted DC voltage to the load 24. The rectification circuit 221 is converter, and includes, for example, a bridge diode (not illustrated) and a smoothing capacitor (not illustrated). The rectification circuit 221, for example, full-wave rectifies the AC voltage received by the power receiving coil unit 211 and smoothes the full-wave rectified voltage using the smoothing capacitor. The rectification circuit 221 supplies the rectified DC voltage to the load 24.

The control comparison unit 222 detects each of the load current and the load voltage. The control comparison unit 222 generates a control signal including each of information indicating the detected load current and information indicating the detected load voltage. The control comparison unit 222 transmits the generated control signal to the wireless power transmission device 10 via the power receiving-side communication unit 23. In the wireless power transmission device 10 having received the control signal, the control circuit 123 performs any one of the aforementioned constant current control, constant voltage control, and constant power control based on the load current and the load voltage indicated by the information included in the control signal acquired via the transmission-side communication unit 14.

The power receiving-side communication unit 23 is, for example, a communication circuit (or a communication device) that transmits and receives signals by wireless communication, optical communication, electromagnetic induction, sound, vibration and the like. The power receiving-side communication unit 23 transmits, for example, the control signal acquired from the control comparison unit 222 to the wireless power transmission device 10.

Note that the load 24 described above may have a configuration including a conversion circuit (for example, a DC/DC converter, a DC/AC inverter and the like) that converts the output of the rectification circuit 221. That is, the load 24 may be configured by, for example, the aforementioned secondary battery, or may be configured by the conversion circuit and the secondary battery.

<Process Performed by Control Circuit>

Figure 2:
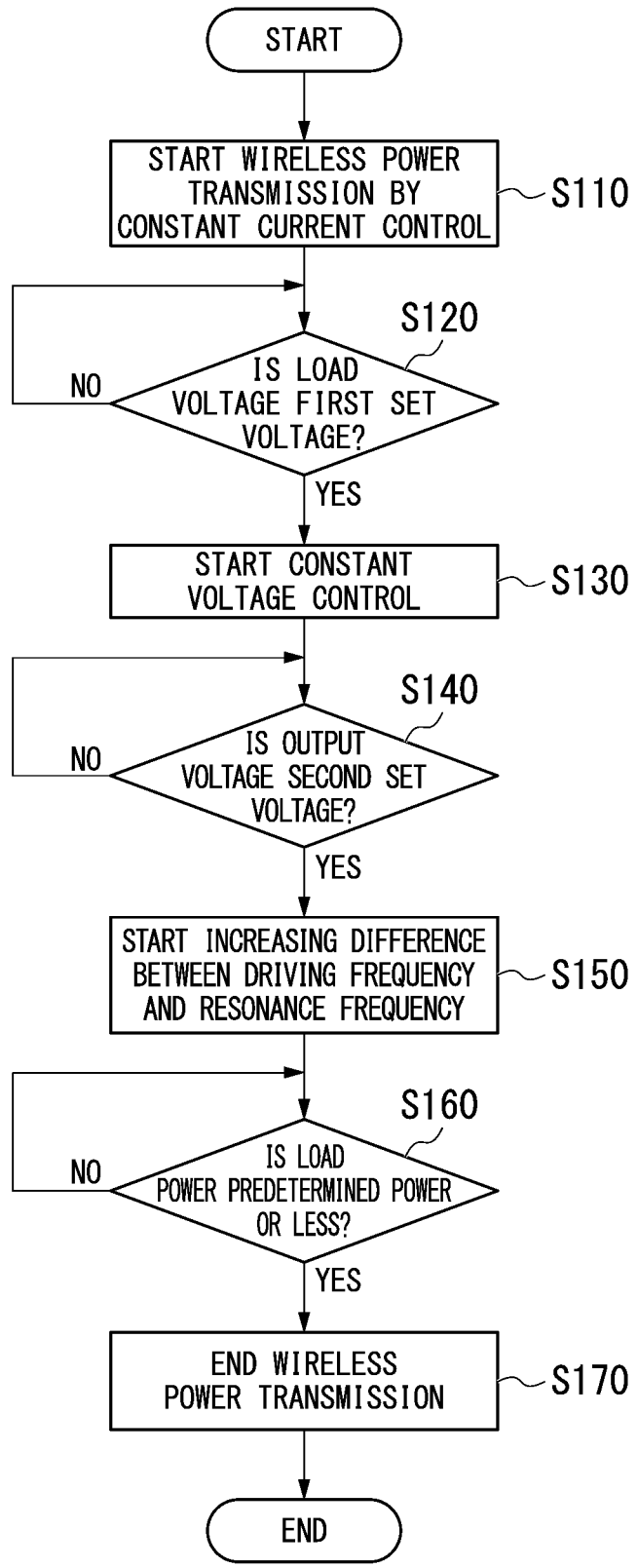
FIG. 2 is a diagram illustrating an example of the flow of a process performed by a control circuit 123.

Hereinafter, a process performed by the control circuit 123 will be described with reference to FIG. 2. FIG. 2 is a diagram illustrating an example of the flow of the process performed by the control circuit 123. Hereinafter, a description will be given, as an example, for a case where the wireless power transmission device 10 receives, from a user, an operation of starting the supply of power to the load 24 by wireless power transmission at a timing before the process of step S110 illustrated in FIG. 2 is performed. Note that the process of the flowchart illustrated in FIG. 2 may be configured to be automatically started by, for example, magnetic coupling between the power transmission coil L1 and the power receiving coil L2, or may be configured to be started by other methods.

The control circuit 123 starts wireless power transmission by the constant current control (step S110). At this time, the control circuit 123 starts control such that the phase difference time between the output voltage of the inverter 122 and the output current of the inverter 122 is a predetermined phase difference time.

Next, the control circuit 123 determines whether the load voltage is the set voltage V1, based on the control signal acquired from the wireless power receiving device 20 in the constant current control (step S120).

When it is determined that the load voltage is not the set voltage V1 (No in step S120), the control circuit 123 transitions to step S120 and determines again whether the load voltage is the set voltage V1, based on the control signal acquired from the wireless power receiving device 20 in the constant current control.

On the other hand, when it is determined that the load voltage is the set voltage V1 (Yes in step S120), the control circuit 123 starts wireless power transmission by the constant voltage control (step S130). In this way, the load current is gradually reduced with the passage of time.

Next, the control circuit 123 determines whether the output voltage of the DC/DC converter 121 is the set voltage V2 (step S140).

When it is determined that the output voltage of the DC/DC converter 121 is not the set voltage V2 (No in step S140), the control circuit 123 transitions to step S140 and determines again whether the output voltage of the DC/DC converter 121 is the set voltage V2.

On the other hand, when it is determined that the output voltage of the DC/DC converter 121 is the set voltage V2 (Yes in step S140), the control circuit 123 ends the control for allowing the phase difference time between the output voltage of the inverter 122 and the output current of the inverter 122 to be the predetermined phase difference time. Then, the control circuit 123 starts increasing the difference between the driving frequency of the inverter 122 and the resonance frequency of the transmission-side resonance circuit (step S150). At this time, the control circuit 123 also starts the aforementioned output voltage holding control. In the embodiment, when increasing the difference between the driving frequency of the inverter 122 and the resonance frequency, the control circuit 123 increases the difference between the driving frequency and the resonance frequency by changing the driving frequency so as to be increased. Note that, when increasing the difference between the driving frequency and the resonance frequency, the control circuit 123 may be configured to increase the difference between the driving frequency and the resonance frequency by changing the driving frequency so as to be decreased.

Next, the control circuit 123 waits until the load power is equal to or less than predetermined power, based on the control signal acquired from the wireless power receiving device 20 in the constant voltage control (step S160).

When it is determined that the load power is equal to or less than predetermined power (Yes in step S160), the control circuit 123 ends the wireless power transmission (step S170) and ends the process.

As described above, when a predetermined condition is satisfied, the control circuit 123 increases the difference between the driving frequency of the inverter 122 and the resonance frequency of the transmission-side resonance circuit by the process of the flowchart illustrated in FIG. 2. In this way, even though the output voltage of the DC/DC converter 121 is the set voltage V2, the control circuit 123 can further reduce the load power, that is, the output power of the wireless power receiving device 20.

Hereinafter, with reference to FIG. 3 to FIG. 6, a description will be given for a temporal change in each of the load voltage, the load current, the load power, the output voltage of the DC/DC converter 121, and the driving frequency of the inverter 122 during the period in which the process of the flowchart illustrated in FIG. 2 is performed.

Figure 3:
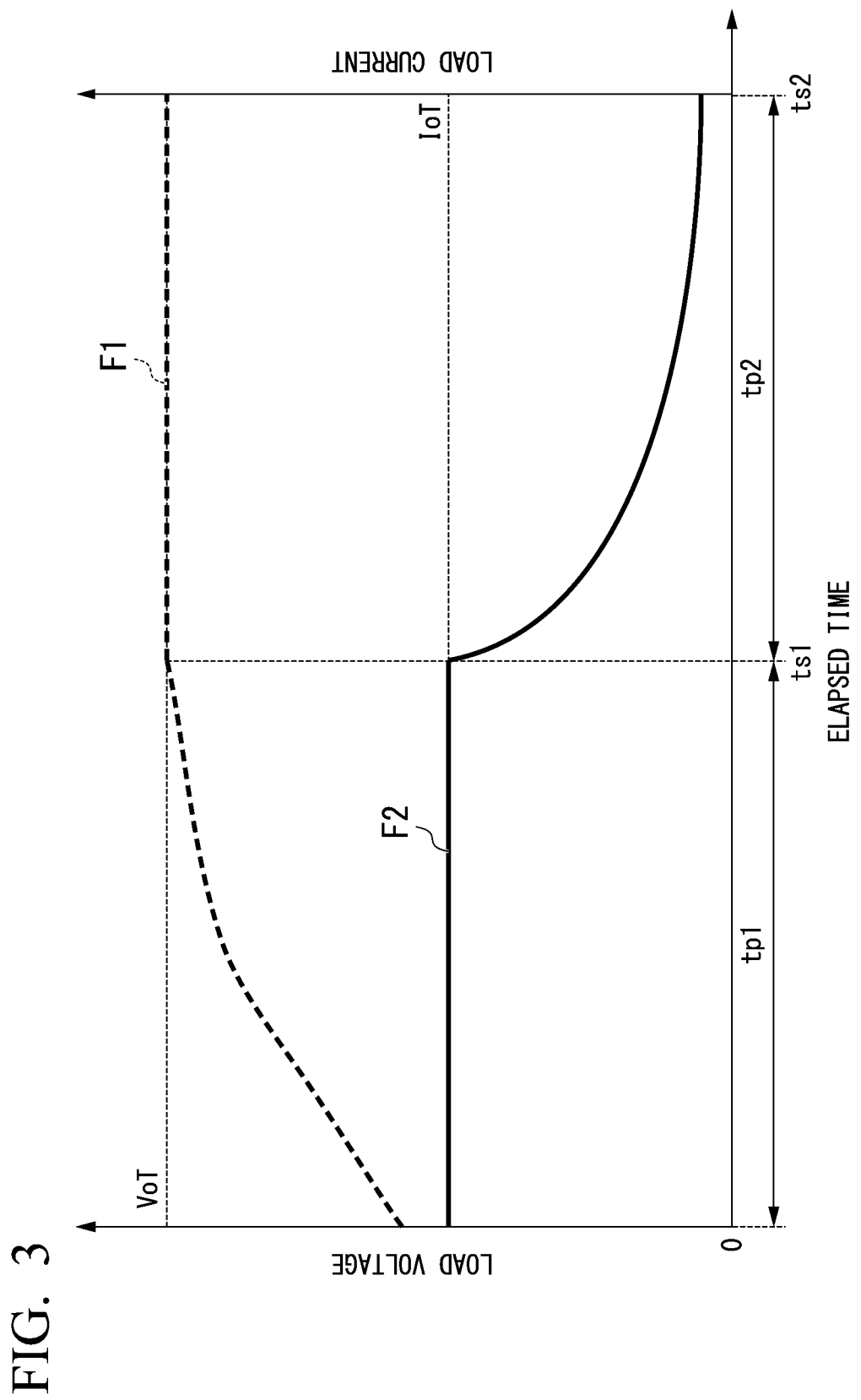
FIG. 3 is a diagram illustrating an example of a temporal change in each of a load voltage and a load current during a period in which the process of the flowchart illustrated in FIG. 2 is performed.
Figure 4:
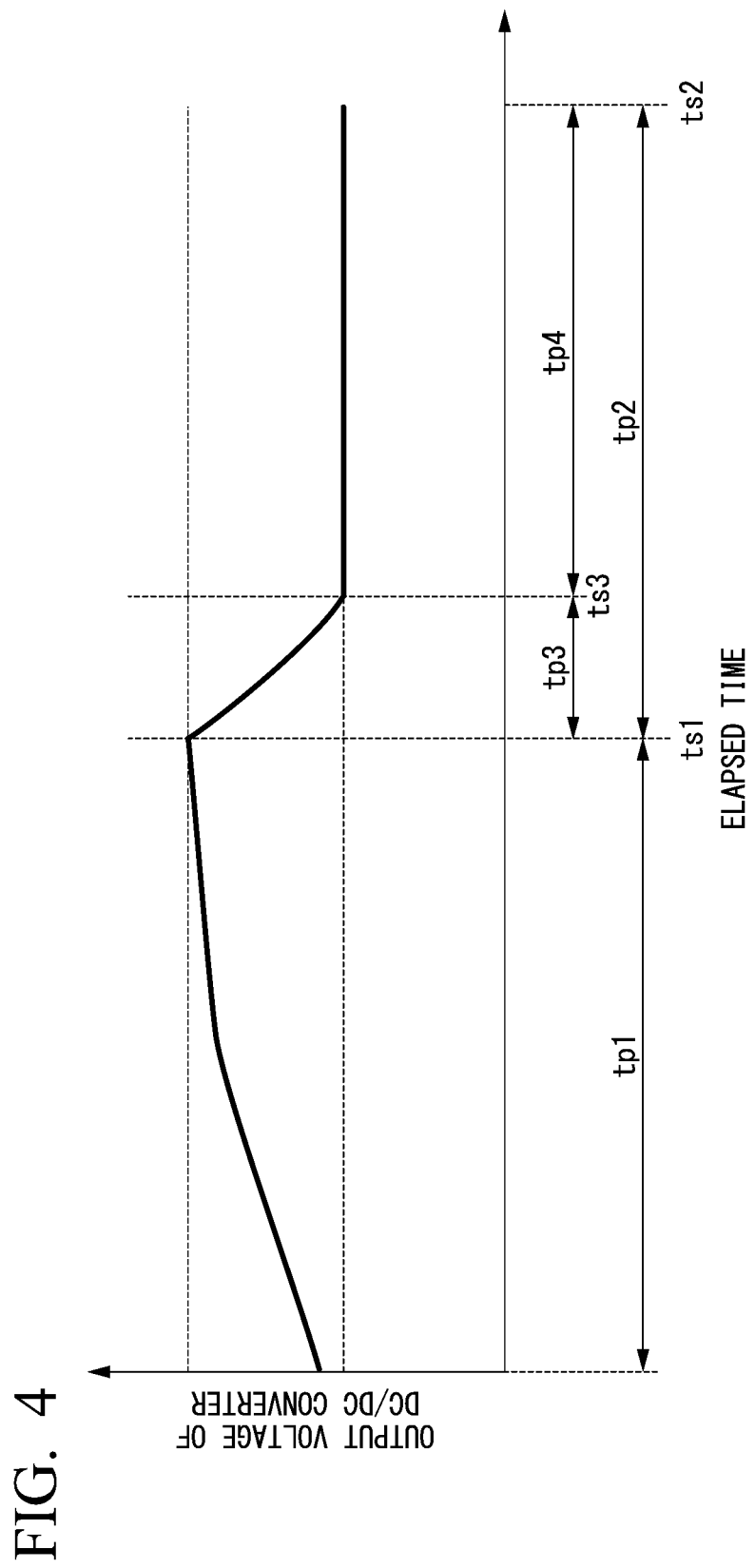
FIG. 4 is a diagram illustrating an example of a temporal change in an output voltage of a DC/DC converter 121 during the period in which the process of the flowchart illustrated in FIG. 2 is performed.
Figure 5:
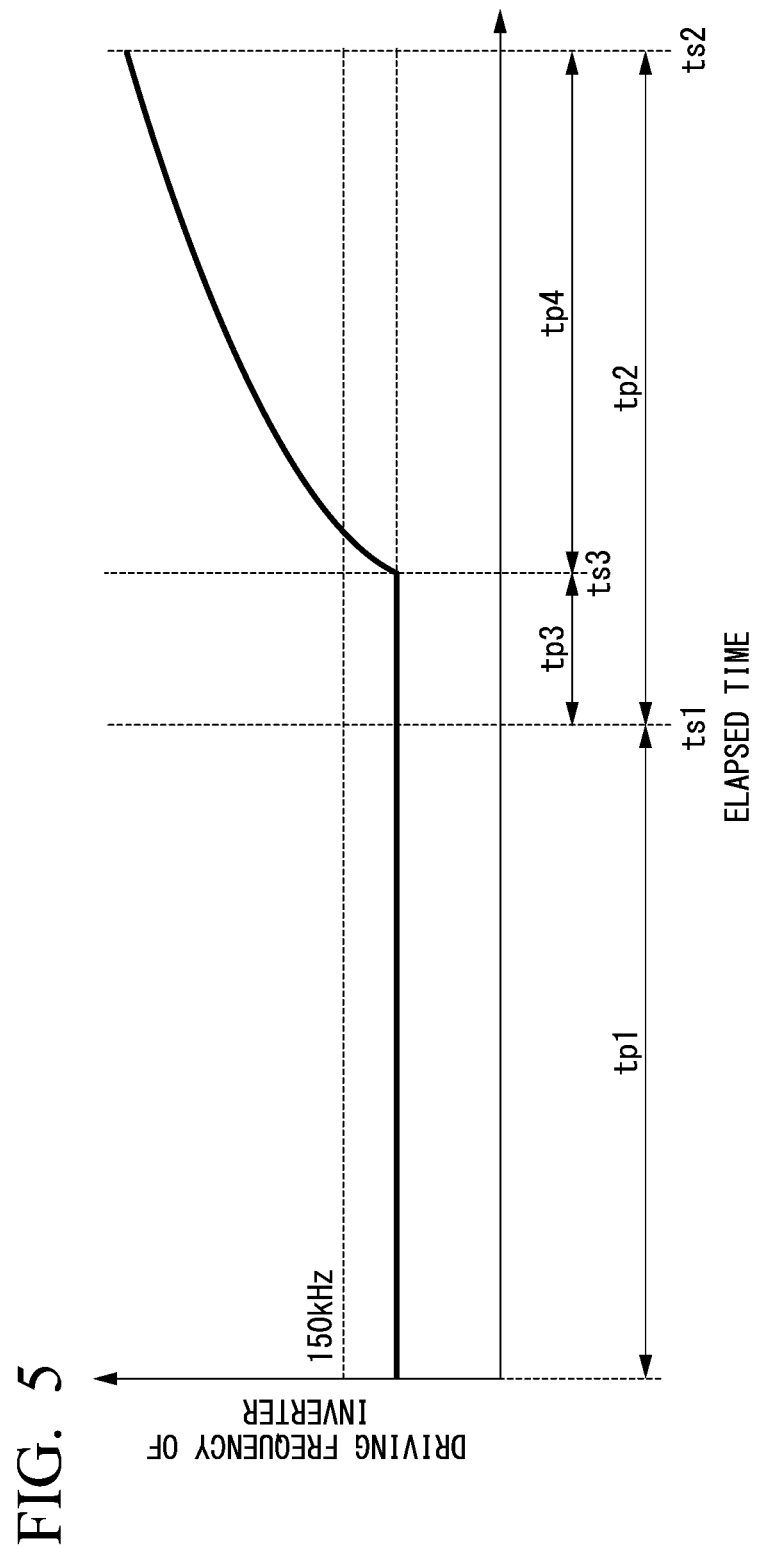
FIG. 5 is a diagram illustrating an example of a temporal change in a driving frequency of an inverter 122 during the period in which the process of the flowchart illustrated in FIG. 2 is performed.
Figure 6:
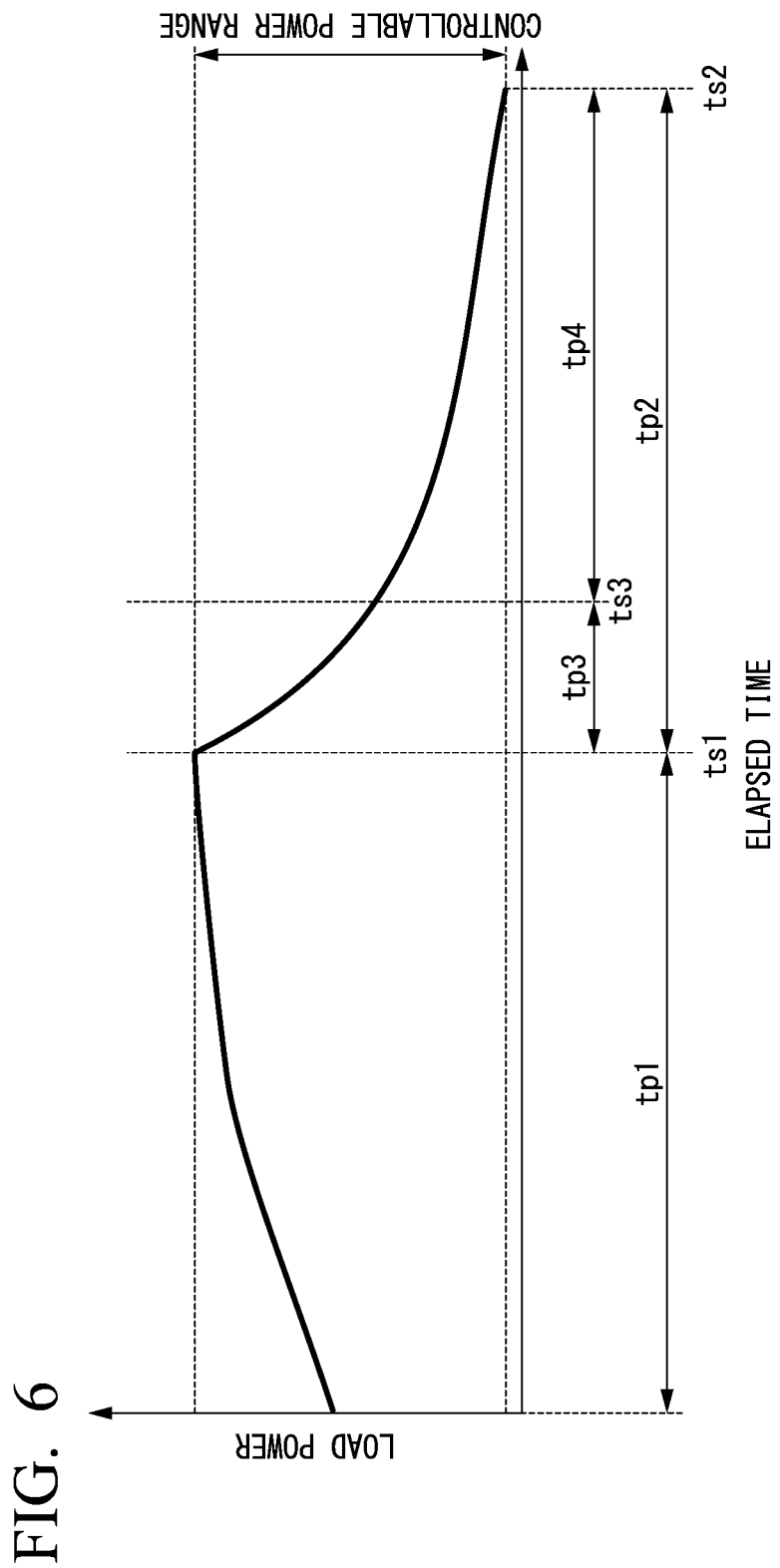
FIG. 6 is a diagram illustrating an example of a temporal change in load power during the period in which the process of the flowchart illustrated in FIG. 2 is performed.

FIG. 3 is a diagram illustrating an example of a temporal change in each of the load voltage and the load current during the period in which the process of the flowchart illustrated in FIG. 2 is performed. FIG. 4 is a diagram illustrating an example of a temporal change in the output voltage of the DC/DC converter 121 during the period in which the process of the flowchart illustrated in FIG. 2 is performed. FIG. 5 is a diagram illustrating an example of a temporal change in the driving frequency of the inverter 122 during the period in which the process of the flowchart illustrated in FIG. 2 is performed. FIG. 6 is a diagram illustrating an example of a temporal change in the load power during the period in which the process of the flowchart illustrated in FIG. 2 is performed. Note that, in the graph illustrated in FIG. 5, a change in the output voltage due to the output voltage holding control during the constant voltage period is omitted. Furthermore, in the graph illustrated in FIG. 6, a change in the driving frequency of the inverter 122 due to the control for allowing the phase difference time between the output voltage of the inverter 122 and the output current of the inverter 122 to be the predetermined phase difference time is omitted.

The time 0 illustrated in FIG. 3 indicates the time at which the wireless power transmission of the wireless power transmission system 1 has started. The time ts1 indicates the time at which the constant voltage control of the control circuit 123 has started after the constant current control of the control circuit 123 ends. That is, the period tp1 from the time 0 to the time ts1 indicates the constant current period. The time ts2 indicates the time at which the wireless power transmission of the wireless power transmission system 1 has ended. That is, the period tp2 from the time ts1 to the time ts2 indicates the constant voltage period. Furthermore, the curve F1 illustrated in FIG. 3 indicates a temporal change in the load voltage during the period in which the process of the flowchart illustrated in FIG. 2 is performed. The curve F2 illustrated in FIG. 3 indicates a temporal change in the load current during the period.

As illustrated in FIG. 3, in the period tp1, the magnitude of the load current is maintained at a current value IoT. Furthermore, in the period tp1, the magnitude of the load voltage increases with the passage of time. The magnitude of the load voltage is the set voltage V1 at the time ts1 (the maximum value of the load voltage in the embodiment). On the other hand, in the period tp2, the magnitude of the load voltage is maintained at a voltage value VoT. Furthermore, in the period tp2, the magnitude of the load current decreases with the passage of time.

Furthermore, as illustrated in FIG. 4, in the period tp1, the magnitude of the output voltage of the DC/DC converter 121 increases with the passage of time. On the other hand, in the period tp2, at the time ts3, the magnitude of the output voltage has reached the set voltage V2 (the lowest value among voltages that can be output by the DC/DC converter 121 in the embodiment). That is, the period tp3 illustrated in FIG. 4 indicates a period in which the control circuit 123 lowers the output voltage of the DC/DC converter 121. In the period tp4 after the time ts3 in the period tp2, the magnitude of the output voltage is still maintained at the set voltage V2. This is because, in the embodiment, the control circuit 123 is not able to further lower the output voltage of the DC/DC converter 121 in the period tp4.

In this regard, as illustrated in FIG. 5, at the time ts3, the control circuit 123 starts to increase the difference between the driving frequency of the inverter 122 and the resonance frequency of the transmission-side resonance circuit. In this way, as illustrated in FIG. 6, the control circuit 123 can continuously lower the load power even after the time ts3, that is, even during the period tp4. In other words, even though the output voltage of the DC/DC converter 121 is the set voltage V2, the wireless power transmission device 10 can further reduce the output power of the wireless power receiving device 20. As a consequence, the wireless power transmission device 10 can widen a controllable power range as compared to a case where no control for increasing the difference between the driving frequency of the inverter 122 and the resonance frequency is performed.

As described above, when the predetermined condition is satisfied, the wireless power transmission device 10 increases the difference between the driving frequency of the inverter 122 and the resonance frequency of the transmission-side resonance circuit. In this way, even though the output voltage of the DC/DC converter 121 is the set voltage V2, the wireless power transmission device 10 can further reduce the output power of the wireless power receiving device 20. For example, even though the output voltage of the DC/DC converter 121 is the lowest value among voltages that can be output by the DC/DC converter 121, the wireless power transmission device 10 can further reduce the output power of the wireless power receiving device 20.

For example, as illustrated in FIG. 5, when the predetermined condition is not satisfied (that is, during both the period tp1 and the period tp3), the control circuit 123 described above maintains the driving frequency of the inverter 122 to a frequency lower than 150 kHz. In other words, in such a case, the control circuit 123 controls the driving frequency of the inverter 122 in a frequency band lower than 150 kHz. This is because a frequency band to which a noise level is restricted by CISPR 11 is a frequency band of 150 kHz or more. Noise generated in the wireless power transmission system 1 tends to be maximum near the same frequency as the driving frequency of the inverter 122. Therefore, by maintaining the driving frequency of the inverter 122 to a frequency lower than 150 kHz when the predetermined condition is not satisfied, the wireless power transmission device 10 can more reliably comply with the restriction imposed by the CISPR 11. On the other hand, when the predetermined condition is satisfied, since the load power is small in the wireless power transmission system 1, the noise level is suppressed to be low as a whole. Accordingly, by maintaining the driving frequency of the inverter 122 to a frequency lower than 150 kHz when the predetermined condition is not satisfied, the control circuit 123 can comply with the restriction imposed by the CISPR 11.

Note that the predetermined condition described above may be, for example, that a relation between the load voltage and the load current matches a predetermined relation. This is because the relation between the load voltage and the load current when the output voltage of the DC/DC converter 121 is the set voltage V2 is uniquely determined in the constant voltage period described above. For example, when a value obtained by multiplying the load voltage and the load current matches a predetermined value, the control circuit 123 determines that the predetermined condition is satisfied. The predetermined value is a value obtained by multiplying the load voltage and the load current in such a case, and is a value determined by prior measurement and the like.

Furthermore, when the predetermined condition is satisfied, the control circuit 123 described above may be configured to perform intermittent operation control for intermittently operating the inverter 122. In this way, similarly to increasing the difference between the driving frequency of the inverter 122 and the resonance frequency of the transmission-side resonance circuit, even when the output voltage of the DC/DC converter 121 is the set voltage V2, the wireless power transmission device 10 can further reduce the load power. Note that such intermittent operation control is control used as a means for the constant voltage control. Therefore, the wireless power transmission device 10 performs such intermittent operation control such that the load voltage is a predetermined third set voltage. The third set voltage may be any voltage. Since details of the intermittent operation of the inverter 122 in the intermittent operation control are known operations, a description thereof will be omitted.

Furthermore, the control comparison unit 222 described above may be configured to generate a control signal including information indicating a difference between the load voltage and a reference voltage and information indicating a difference between the load current and a reference current, instead of being configured to generate a control signal including information indicating the load voltage and information indicating the load current.

Furthermore, the control circuit 123 described above may have a configuration provided in the wireless power receiving device 20. In such a case, the control circuit 123 transmits a second control signal for controlling each of the output voltage of the DC/DC converter 121 and the driving frequency of the inverter 122 to the wireless power transmission device 10 via the power receiving-side communication unit 23. Then, in such a case, the wireless power transmission device 10 controls the output voltage of the DC/DC converter 121 and the driving frequency of the inverter 122 based on the received second control signal.

Furthermore, instead of being the lowest value in the voltage range set as the output limit range for the output voltage of the DC/DC converter 121, the set voltage V2 described above may be any voltage among voltages higher than the lowest value. Furthermore, the set voltage V2 may be an arbitrary voltage set regardless of the output limit range.

<Circuit Configuration of Each of Transmission-Side Resonance Circuit and Power Receiving-Side Resonance Circuit>

Hereinafter, with reference to FIG. 7 to FIG. 9, a description will be given for a specific example of the circuit configuration of each of the transmission-side resonance circuit and the power receiving-side resonance circuit described above.

Figure 7:
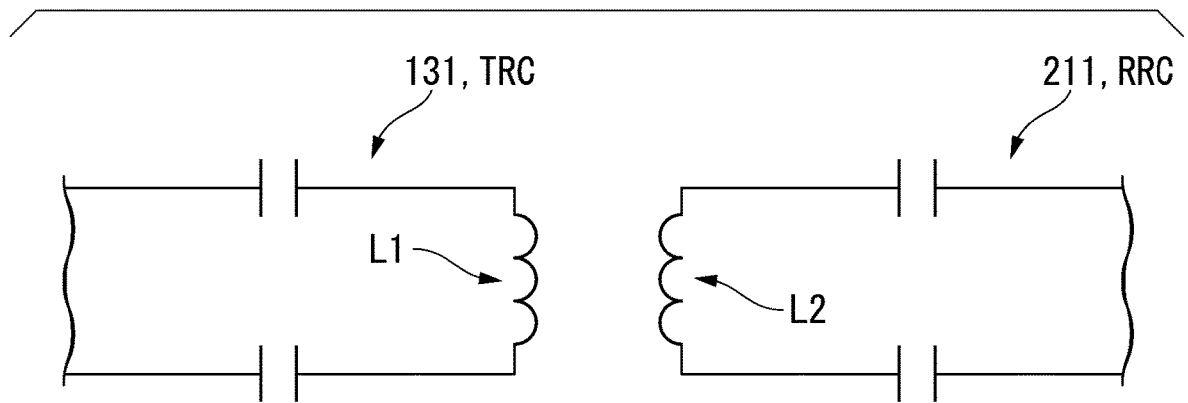
FIG. 7 is a diagram illustrating a circuit configuration of each of a transmission-side resonance circuit included in a power transmission coil unit 131 and a power receiving-side resonance circuit included in a power receiving coil unit 211.

In the wireless power transmission system 1, for example, as illustrated in FIG. 7, the power transmission coil unit 131 includes the transmission-side resonance circuit and the power receiving coil unit 211 includes the power receiving-side resonance circuit. FIG. 7 is a diagram illustrating an example of the circuit configuration of each of the transmission-side resonance circuit included in the power transmission coil unit 131 and the power receiving-side resonance circuit included in the power receiving coil unit 211. A resonance circuit TRC illustrated in FIG. 7 illustrates an example of the transmission-side resonance circuit included in the power transmission coil unit 131. Furthermore, a resonance circuit RRC illustrated in FIG. 7 illustrates an example of the power receiving-side resonance circuit included in the power receiving coil unit 211.

In the example illustrated in FIG. 7, the resonance circuit TRC includes two capacitors together with a power transmission coil L1. Note that the resonance circuit TRC may have a configuration including another circuit element, instead of any one of the two capacitors, as long as it is a resonance circuit including the power transmission coil L1.

Furthermore, in the example illustrated in FIG. 7, the resonance circuit TRC has a configuration in which the power transmission coil L1 and the two capacitors are connected in series so as to form a resonance circuit; however, instead, the resonance circuit TRC may have a configuration in which the power transmission coil L1 and the two capacitors are connected in parallel so as to form a resonance circuit, or a configuration in which the power transmission coil L1 and the two capacitors are connected in series and in parallel so as to form a resonance circuit.

Furthermore, in the example illustrated in FIG. 7, the resonance circuit RRC includes two capacitors together with a power receiving coil L2. Note that the resonance circuit RRC may have a configuration including another circuit element, instead of any one of the two capacitors, as long as it is a resonance circuit including the power receiving coil L2.

Furthermore, in the example illustrated in FIG. 7, the resonance circuit RRC has a configuration in which the power receiving coil L2 and the two capacitors are connected in series so as to form a resonance circuit; however, instead, the resonance circuit RRC may have a configuration in which the power receiving coil L2 and the two capacitors are connected in parallel so as to form a resonance circuit, or a configuration in which the power receiving coil L2 and the two capacitors are connected in series and in parallel so as to form a resonance circuit.

Figure 8:
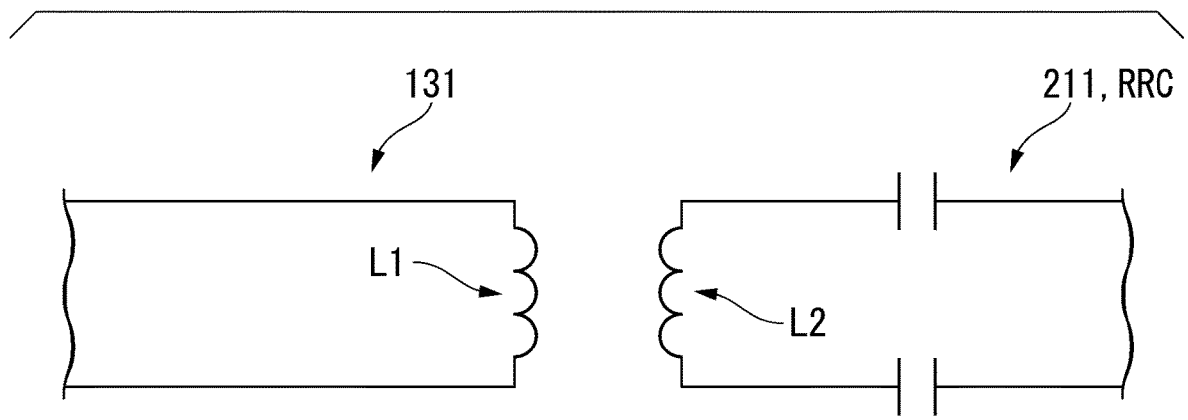
FIG. 8 is a diagram illustrating an example of the circuit configuration of the power receiving-side resonance circuit included in the power receiving coil unit 211.

In the wireless power transmission system 1, for example, as illustrated in FIG. 8, the power transmission coil unit 131 may not include the transmission-side resonance circuit and the power receiving coil unit 211 may include the power receiving-side resonance circuit. FIG. 8 is a diagram illustrating an example of the circuit configuration of the power receiving-side resonance circuit included in the power receiving coil unit 211. Note that FIG. 8 illustrates the power transmission coil unit 131 as a comparison target of the power receiving coil unit 211. In the example illustrated in FIG. 8, the power transmission coil unit 131 does not include the transmission-side resonance circuit. On the other hand, in such an example, the power receiving coil unit 211 includes a resonance circuit RRC as the power receiving-side resonance circuit.

Furthermore, also in the example illustrated in FIG. 8, the resonance circuit RRC includes two capacitors together with a power receiving coil L2. Note that the resonance circuit RRC may have a configuration including another circuit element, instead of any one of the two capacitors, as long as it is a resonance circuit including the power receiving coil L2.

Furthermore, also in the example illustrated in FIG. 8, the resonance circuit RRC has a configuration in which the power receiving coil L2 and the two capacitors are connected in series so as to form a resonance circuit; however, instead, the resonance circuit RRC may have a configuration in which the power receiving coil L2 and the two capacitors are connected in parallel so as to form a resonance circuit, or a configuration in which the power receiving coil L2 and the two capacitors are connected in series and in parallel so as to form a resonance circuit.

Figure 9:
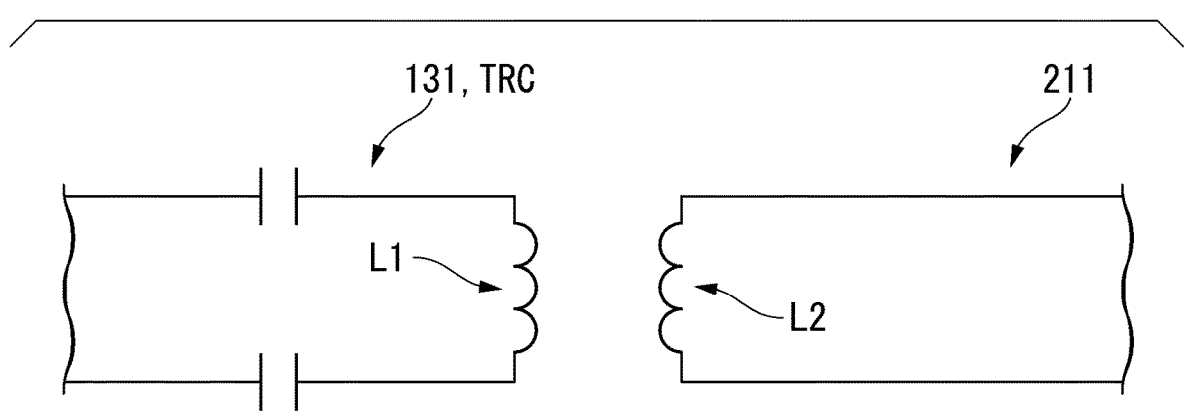
FIG. 9 is a diagram illustrating an example of the circuit configuration of the transmission-side resonance circuit included in the power transmission coil unit 131.

In the wireless power transmission system 1, for example, as illustrated in FIG. 9, the power transmission coil unit 131 may include the transmission-side resonance circuit and the power receiving coil unit 211 may not include the power receiving-side resonance circuit. FIG. 9 is a diagram illustrating an example of the circuit configuration of the transmission-side resonance circuit included in the power transmission coil unit 131. Note that FIG. 9 illustrates the power receiving coil unit 211 as a comparison target of the power transmission coil unit 131. In the example illustrated in FIG. 9, the power receiving coil unit 211 does not include the power receiving-side resonance circuit. On the other hand, in such an example, the power transmission coil unit 131 includes a resonance circuit TRC as the transmission-side resonance circuit.

Furthermore, also in the example illustrated in FIG. 9, the resonance circuit TRC includes two capacitors together with a power transmission coil L1. Note that the resonance circuit TRC may have a configuration including another circuit element, instead of any one of the two capacitors, as long as it is a resonance circuit including the power transmission coil L1.

Furthermore, also in the example illustrated in FIG. 9, the resonance circuit TRC has a configuration in which the power transmission coil L1 and the two capacitors are connected in series so as to form a resonance circuit; however, instead, the resonance circuit TRC may have a configuration in which the power transmission coil L1 and the two capacitors are connected in parallel so as to form a resonance circuit, or a configuration in which the power transmission coil L1 and the two capacitors are connected in series and in parallel so as to form a resonance circuit.

As described above, the wireless power transmission device according to each embodiment described above (the wireless power transmission device 10 in the example described above) is a wireless power transmission device configured to transmit AC power to a wireless power receiving device (the wireless power receiving device 20 in the example described above) including a power receiving coil (the power receiving coil L2 in the example described above) by using an AC magnetic field, and includes a DC/DC converter (the DC/DC converter 121 in the example described above), an inverter (the inverter 122 in the example described above) configured to convert an output voltage of the DC/DC converter into an AC voltage having a driving frequency, a power transmission coil (the power transmission coil L1 in the example described above) configured for the AC voltage to be supplied to from the inverter and configured to generate the AC magnetic field, a transmission-side resonance circuit including the power transmission coil, and a control circuit (the control circuit 123 in the example described above) configured to increase a difference between a driving frequency of the inverter and a resonance frequency of the transmission-side resonance circuit when a predetermined condition is satisfied. In this way, even though the output voltage of the DC/DC converter is the lowest value, the wireless power transmission device can further reduce an output voltage of the wireless power receiving device that receives power transmitted from the wireless power transmission device.

Furthermore, the wireless power transmission device is a wireless power transmission device configured to transmit AC power to a wireless power receiving device including a power receiving-side resonance circuit including a power receiving coil by using an AC magnetic field, and includes a DC/DC converter, an inverter configured to convert an output voltage of the DC/DC converter into an AC voltage having a driving frequency, a power transmission coil configured for the AC voltage to be supplied to from the inverter and configured to generate the AC magnetic field, and a control circuit configured to increase a difference between a driving frequency of the inverter and a resonance frequency of the power receiving-side resonance circuit when a predetermined condition is satisfied. In this way, even though the output voltage of the DC/DC converter is the lowest value, the wireless power transmission device can further reduce an output voltage of the wireless power receiving device that receives power transmitted from the wireless power transmission device.

Furthermore, the wireless power transmission device may use a configuration in which the control circuit is configured to change any one value of an output power, an output voltage, and an output current of the wireless receiving device toward a predetermined value by increasing the difference between the driving frequency of the inverter and the resonance frequency of the transmission-side resonance circuit in a feedback control for changing the one value to be the predetermined value, when the predetermined condition is satisfied.

Furthermore, the wireless power transmission device is a wireless power transmission device configured to transmit AC power to a wireless power receiving device including a power receiving coil by using an AC magnetic field, and includes a DC/DC converter, an inverter configured to convert an output voltage of the DC/DC converter into an AC voltage having a driving frequency, a power transmission coil configured for the AC voltage to be supplied to from the inverter and configured to generate the AC magnetic field, and a control circuit configured to perform intermittent operation control for intermittently operating the inverter when a predetermined condition is satisfied. In this way, even though the output voltage of the DC/DC converter is the lowest value, the wireless power transmission device can further reduce an output voltage of the wireless power receiving device that receives power transmitted from the wireless power transmission device.

Furthermore, the wireless power transmission device may use a configuration in which the predetermined condition is that the output voltage of the DC/DC converter is equal to or less than a predetermined first set voltage.

Furthermore, the wireless power transmission device may use a configuration in which the first set voltage is the lowest value among voltages that can be output by the DC/DC converter.

Furthermore, the wireless power transmission device may use a configuration in which the first set voltage is a voltage higher than the lowest value among voltages that can be output by the DC/DC converter and is a set voltage.

Furthermore, the wireless power transmission device may use a configuration in which the predetermined condition is that a relation between a load voltage of a load connected to the wireless power receiving device and a load current of the load matches a predetermined relation.

Furthermore, the wireless power transmission device may use a configuration in which the control circuit configured to perform output voltage holding control for controlling the output voltage of the DC/DC converter to be a target voltage that is a target for matching the output voltage of the DC/DC converter, when the predetermined condition is satisfied.

Furthermore, the wireless power transmission device may use a configuration in which the control circuit configured to control the driving frequency of the inverter and controls a phase difference time between an output voltage of the inverter and an output current of the inverter to be a predetermined phase difference time, when the predetermined condition is not satisfied.

Furthermore, the wireless power transmission device may use a configuration in which the control circuit configured to control the driving frequency of the inverter and controls a phase difference angle between an output voltage of the inverter and an output current of the inverter to be a predetermined phase difference angle, when the predetermined condition is not satisfied.

Furthermore, the wireless power transmission device may use a configuration in which the control circuit configured to control the driving frequency of the inverter in a frequency band lower than 150 kHz, when the predetermined condition is not satisfied.

For Above Embodiments

A program for implementing some or all of the functions of each device (for example, the wireless power transmission device 10, the wireless power receiving device 20 and the like) according to the embodiments described above may be recorded on a computer readable recording medium (storage medium), and may be read and executed by a computer system to perform processing.

Note that the "computer system" herein may include an operating system (OS) or hardware such as a peripheral device.

Furthermore, the "computer readable recording medium" refers to a writable nonvolatile memory such as a flexible disk, a magneto-optical disk, a read only memory (ROM), and a flash memory, a portable medium such as a digital versatile disc (DVD), or a storage device such as a hard disk built in the computer system. Furthermore, the recording medium may be, for example, a recording medium that temporarily records data.

Moreover, the "computer readable recording medium" is assumed to include a medium for holding a program for a certain period of time such as a volatile memory (for example, a dynamic random access memory (DRAM)) in the computer system serving as a server or a client in the case of transmitting the program via a network such as the Internet or a communication line such as a telephone line.

Furthermore, the aforementioned program may be transmitted from a computer system having stored the program in a recording device and the like to other computer systems via a transmission medium or a transmission wave of the transmission medium. The "transmission medium" for transmitting the program refers to a medium having an information transmission function such as a network (communication network) such as the Internet or a communication line such as a telephone line.

Furthermore, the aforementioned program may be a program for implementing some of the aforementioned functions. Moreover, the aforementioned program may also be a program capable of implementing the aforementioned functions by a combination with a program previously recorded in the computer system, a so-called a difference file (difference program).

So far, the embodiment of the invention has been described in detail with reference to the drawings; detailed configurations are not limited to the embodiment and may be subjected to modification, replacement, deletion and the like without departing from the spirit of the invention.

REFERENCE SIGNS LIST

1 Wireless power transmission system
10 Wireless power transmission device
11 DC power supply
12 Power transmission circuit
13 Power transmission coil part
14 Transmission-side communication unit
20 Wireless power receiving device
21 Power receiving coil part
22 Power receiving circuit
23 Power receiving-side communication unit
24 Load
121 DC/DC converter
122 Inverter
123 Control circuit
131 Power transmission coil unit
211 Power receiving coil unit
221 Rectification circuit
222 Control comparison unit
L1 Power transmission coil
L2 Power receiving coil

What is claimed is:

1. A wireless power transmission device configured to transmit AC (Alternating Current) power to a wireless power receiving device including a power receiving coil by using an AC magnetic field, the wireless power transmission device comprising:
a DC (Direct Current)/DC converter;
an inverter configured to convert an output voltage of the DC/DC converter into an AC voltage having a driving frequency;
a power transmission coil configured for the AC voltage to be supplied to from the inverter and configured to generate the AC magnetic field;
a transmission-side resonance circuit including the power transmission coil; and
a control circuit configured to increase a difference between the driving frequency of the inverter and a resonance frequency of the transmission-side resonance circuit without decreasing the difference, when a predetermined condition is satisfied.

2. The wireless power transmission device according to claim 1, wherein the control circuit is configured to change any one value of an output power, an output voltage, and an output current of the wireless power receiving device toward a predetermined value by increasing the difference between the driving frequency of the inverter and the resonance frequency of the transmission-side resonance circuit in a feedback control for changing the one value to be the predetermined value, when the predetermined condition is satisfied.

3. The wireless power transmission device according to claim 1, wherein the predetermined condition is that the output voltage of the DC/DC converter is equal to or less than a predetermined first set voltage.

4. The wireless power transmission device according to claim 3, wherein the first set voltage is the lowest value among voltages that can be output by the DC/DC converter.

5. The wireless power transmission device according to claim 3, wherein the first set voltage is a voltage higher than the lowest value among voltages that can be output by the DC/DC converter and is a set voltage.

6. The wireless power transmission device according to claim 1, wherein the predetermined condition is that a relation between a load voltage of a load connected to the wireless power receiving device and a load current of the load matches a predetermined relation.

7. The wireless power transmission device according to claim 1, wherein the control circuit is configured to perform changing the output voltage of the DC/DC converter to a target voltage, when the predetermined condition is satisfied.

8. The wireless power transmission device according to claim 1, wherein the control circuit is configured to control the driving frequency of the inverter and to control a phase difference time between an output voltage of the inverter and an output current of the inverter to be a predetermined phase difference time, when the predetermined condition is not satisfied.

9. The wireless power transmission device according to claim 1, wherein the control circuit is configured to control the driving frequency of the inverter and to control a phase difference angle between an output voltage of the inverter and an output current of the inverter to be a predetermined phase difference angle, when the predetermined condition is not satisfied.

10. The wireless power transmission device according to claim 1, wherein the control circuit causes the inverter to operate in a frequency band lower than 150 kHz, when the predetermined condition is not satisfied.

11. A wireless power transmission system comprising:
the wireless power transmission device according to claim 1; and
the wireless power receiving device.

12. A wireless power transmission device configured to transmit AC power to a wireless power receiving device including a power receiving-side resonance circuit including a power receiving coil by using an AC magnetic field, the wireless power transmission device comprising:
a DC/DC converter;
an inverter configured to convert an output voltage of the DC/DC converter into an AC voltage having a driving frequency;
a power transmission coil configured for the AC voltage to be supplied to from the inverter and configured to generate the AC magnetic field; and
a control circuit configured to increase a difference between the driving frequency of the inverter and a resonance frequency of the power receiving-side resonance circuit when a predetermined condition is satisfied.

13. The wireless power transmission device according to claim 12, wherein the control circuit is configured to change any one value of an output power, an output voltage, and an output current of the wireless power receiving device toward a predetermined value by increasing the difference between the driving frequency of the inverter and the resonance frequency of the power receiving-side resonance circuit in a feedback control for changing the one value to be the predetermined value, when the predetermined condition is satisfied.

14. The wireless power transmission device according to claim 12, wherein the predetermined condition is that the output voltage of the DC/DC converter is equal to or less than a predetermined first set voltage.

15. The wireless power transmission device according to claim 14, wherein the first set voltage is the lowest value among voltages that can be output by the DC/DC converter.

16. The wireless power transmission device according to claim 14, wherein the first set voltage is a voltage higher than the lowest value among voltages that can be output by the DC/DC converter and is a set voltage.

17. The wireless power transmission device according to claim 12, wherein the predetermined condition is that a relation between a load voltage of a load connected to the wireless power receiving device and a load current of the load matches a predetermined relation.

18. The wireless power transmission device according to claim 12, wherein the control circuit is configured to perform changing the output voltage of the DC/DC converter to a target voltage, when the predetermined condition is satisfied.

19. The wireless power transmission device according to claim 12, wherein the control circuit is configured to control the driving frequency of the inverter and to control a phase difference time between an output voltage of the inverter and an output current of the inverter to be a predetermined phase difference time, when the predetermined condition is not satisfied.

20. The wireless power transmission device according to claim 12, wherein the control circuit is configured to control the driving frequency of the inverter and to control a phase difference angle between an output voltage of the inverter and an output current of the inverter to be a predetermined phase difference angle, when the predetermined condition is not satisfied.

21. The wireless power transmission device according to claim 12, wherein the control circuit causes the inverter to operate in a frequency band lower than 150 kHz, when the predetermined condition is not satisfied.

22. A wireless power transmission system comprising:
the wireless power transmission device according to claim 12; and
the wireless power receiving device.

23. A wireless power transmission device configured to transmit AC power to a wireless power receiving device including a power receiving coil by using an AC magnetic field, the wireless power transmission device comprising:
a DC/DC converter;
an inverter configured to convert an output voltage of the DC/DC converter into an AC voltage having a driving frequency;
a power transmission coil configured for the AC voltage to be supplied to from the inverter and configured to generate the AC magnetic field; and
a control circuit configured to perform intermittent operation control for intermittently operating the inverter when a predetermined condition is satisfied.

24. The wireless power transmission device according to claim 23, wherein the predetermined condition is that the output voltage of the DC/DC converter is equal to or less than a predetermined first set voltage.

25. The wireless power transmission device according to claim 24, wherein the first set voltage is the lowest value among voltages that can be output by the DC/DC converter.

26. The wireless power transmission device according to claim 24, wherein the first set voltage is a voltage higher than the lowest value among voltages that can be output by the DC/DC converter and is a set voltage.

27. The wireless power transmission device according to claim 23, wherein the predetermined condition is that a relation between a load voltage of a load connected to the wireless power receiving device and a load current of the load matches a predetermined relation.

28. The wireless power transmission device according to claim 23, wherein the control circuit is configured to perform changing the output voltage of the DC/DC converter to a target voltage, when the predetermined condition is satisfied.

29. The wireless power transmission device according to claim 23, wherein the control circuit is configured to control the driving frequency of the inverter and to control a phase difference time between an output voltage of the inverter and an output current of the inverter to be a predetermined phase difference time, when the predetermined condition is not satisfied.

30. The wireless power transmission device according to claim 23, wherein the control circuit is configured to control the driving frequency of the inverter and to control a phase difference angle between an output voltage of the inverter and an output current of the inverter to be a predetermined phase difference angle, when the predetermined condition is not satisfied.

31. The wireless power transmission device according to claim 23, wherein the control circuit causes the inverter to operate in a frequency band lower than 150 kHz, when the predetermined condition is not satisfied.

32. A wireless power transmission system comprising:
the wireless power transmission device according to claim 23; and
the wireless power receiving device.

* * * * *